United States Patent [19]
Debeneix

[11] Patent Number: 5,259,183
[45] Date of Patent: Nov. 9, 1993

[54] TURBOJET ENGINE EXHAUST CASING WITH INTEGRAL SUSPENSION LUGS

[75] Inventor: Pierre Debeneix, St Sauveur sur Ecole, France

[73] Assignee: Societe Nationale d'Etude et de Construction de Moteurs d'Aviation "S.N.E.C.M.A.", Paris, France

[21] Appl. No.: 899,909

[22] Filed: Jun. 17, 1992

[30] Foreign Application Priority Data

Jun. 19, 1991 [FR] France ................... 91 07514

[51] Int. Cl.$^5$ ............................... F02C 7/20
[52] U.S. Cl. ..................... 60/39.31; 244/54; 248/554
[58] Field of Search ............ 60/39.31, 39.32, 271; 244/54; 248/554

[56] References Cited

U.S. PATENT DOCUMENTS

| | | | |
|---|---|---|---|
| 3,806,607 | 4/1974 | Kutney | 60/39.31 |
| 4,492,078 | 1/1985 | Williamson | 60/39.31 |
| 4,520,974 | 6/1985 | Debeneix | 244/54 |
| 5,078,342 | 1/1992 | Langley et al. | 244/54 X |

FOREIGN PATENT DOCUMENTS

| | | |
|---|---|---|
| 0431800 | 6/1991 | European Pat. Off. |
| 1506952 | 4/1978 | United Kingdom |
| 2129501 | 5/1984 | United Kingdom |

Primary Examiner—Richard A. Bertsch
Assistant Examiner—Michael I. Kocharov
Attorney, Agent, or Firm—Oblon, Spivak, McClelland, Maier & Neustadt

[57] ABSTRACT

The exhaust casing of a turbojet engine has a polygonal cross-section and carries at least three hanging lugs provided with holes designed to receive fixing axles of a rear suspension structure for the engine. The axes of these holes are situated at vertices of the polygon defined by the cross-section of the casing, and this polygon is regular except at the position of each of the hanging lugs, where it is deformed to displace the respective vertex radially outward.

3 Claims, 3 Drawing Sheets

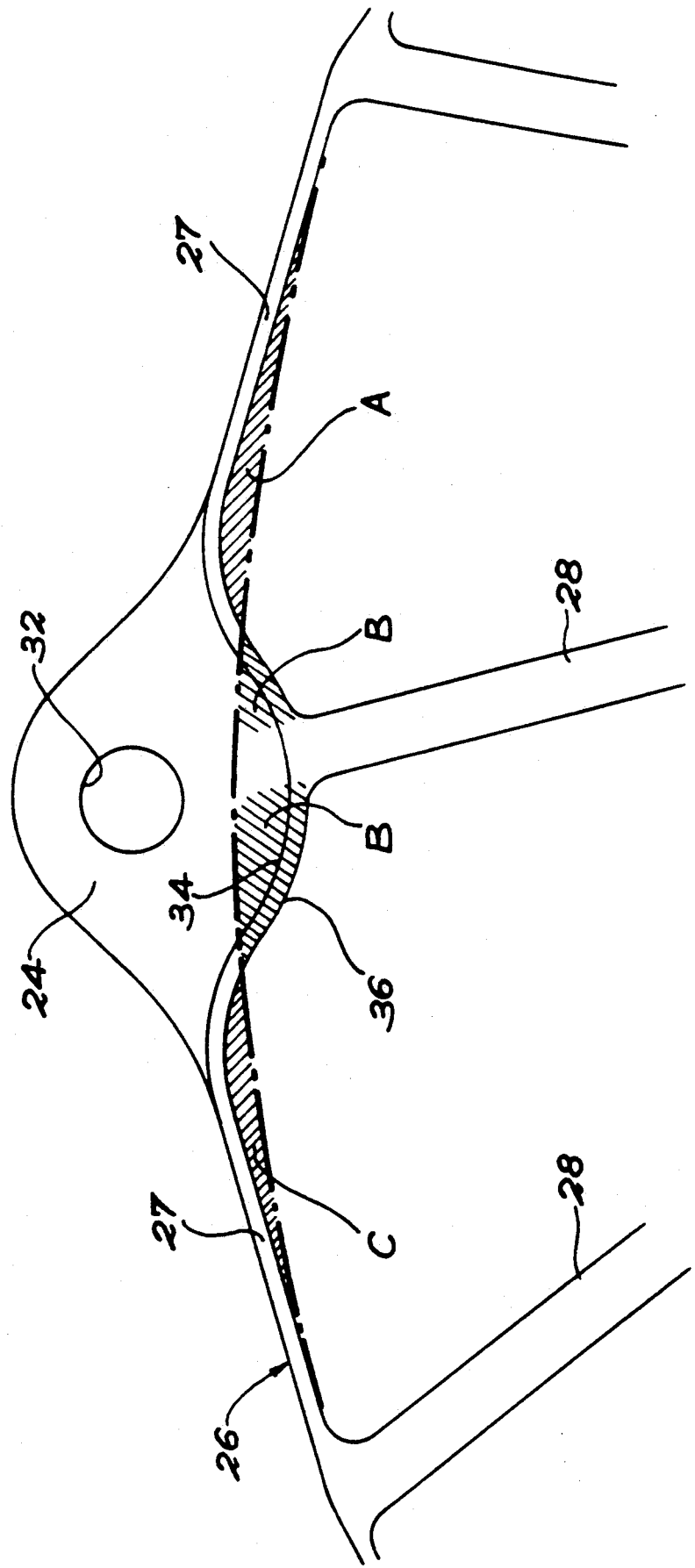

TURBOJET ENGINE EXHAUST CASING WITH INTEGRAL SUSPENSION LUGS

BACKGROUND OF THE INVENTION

1. Field of the Invention

The invention relates to the exhaust casing of a turbojet engine provided with hanging lugs for the attachment of the rear suspension structure by which the engine is suspended from a mast situated under the wing of an aircraft.

2. Summary of the Prior Art

The hanging of a turbojet engine under the wing of an aircraft is effected by means of a mast designed to ensure the mechanical transmission of the stresses between the engine and the aircraft structure. The turbojet engine is suspended from the mast at two points defining a front suspension and a rear suspension. The transmission of the thrust itself is effected by inclined thrust take-up bars situated on both sides of the engine.

The rear suspension structure normally comprises at least three outer hanging lugs or forks which are formed integrally with the upper part of the turbojet engine exhaust casing. These lugs permit the exhaust casing to be fixed to the lower ends of three suspension links which have their upper ends mounted on an arcuate hanging structure fixed directly under the mast serving to support the turbojet engine.

In the case where the exhaust casing has a cross-section in the form of a regular polygon the sides of which are defined by flat plates of the casing, the geometrical axes of the hanging lugs are normally situated at vertices of the polygon. This characteristic permits only tensile or compressive suspension stresses to be generated in the structure of the flat plates adjacent the hanging lugs. This enables the thickness of these plates to be given a minimum value which would be inadequate if the method of suspension were to bring about bending stresses.

The hanging lugs are attached to the lower ends of the suspension links by fixing axles oriented parallel to the geometrical axis of the turbojet engine. This leads to the formation of a scallop-shaped indented part in the outer surface of the turbojet engine exhaust casing in line with each of the hanging lugs. The depth of this indented part is all the greater as the loads to be transmitted are the more substantial, because the diameter of the securing axles must be increased.

The exhaust casing supports a central casing or hub by means of arms which are inclined relative to a radial direction and are connected to the exhaust casing at the vertices of the polygonal cross-section thereof. These arms define between them sectors in which the gases issuing from the turbojet combusion chamber are channelled. The indented parts formed in line with the hanging lugs thus have the effect of reducing the cross-sectional area of flow of the exhaust gases in the corresponding sectors. The disturbance thus generated relative to the theoretical flow stream of the gases in each sector results in a lowering of the turbojet output and an increase in fuel consumption. These effects are all the more marked as the load transmitted through each of the hanging lugs is increased.

Furthermore, the inclined arms supporting the central hub are of unequal lengths, depending on whether or not they are connected to the exhaust casing at the location of a hanging lug. This introduces an imbalance when thermal expansions occur at the various speeds of the turbojet engine.

To overcome these drawbacks the hanging lugs may be moved outward relative to the vertices of the polygonal cross-section of the exhaust casing, as illustrated in particular in document GB-A-1 506 952. However, the stresses created by the suspension of the turbojet then introduce localized bendings in the flat plates forming the exhaust casing, which requires the thickness of the plates to be increased and, consequently, increases the mass of the turbojet. Thus, a result is obtained which is the reverse of that being sought.

SUMMARY OF THE INVENTION

It is an object of the invention, therefore, to provide a turbojet engine exhaust casing of the type having hanging lugs forming part of the rear suspension structure of the engine, the design of which permits the continuity of the theoretical flow path of the exhaust gases to be preserved and the mechanical behavior of the assembly under thermal expansion to be improved, without causing any local bending in the plates forming the sides of the exhaust casing and, consequently, without causing any increase in the mass of the turbojet engine.

To this end, according to the invention there is provided an exhaust casing for a turbojet engine, the casing having a cross-sectional shape substantially in the form of a polygon possessing a plurality of vertices, and at least three hanging lugs carried externally by the casing to form part of a rear suspension structure for the engine. Each of the hanging lugs having a geometrical axis situated at a respective vertex of the polygon, wherein a first polygon can be drawn through said vertices of the polygon not having a hanging lug thereat, and the vertices at which said hanging lugs are located are offset radially outward relative to the first polygon.

In other words, the polygonal cross-section of the turbojet engine exhaust casing is deformed radially outwards at the vertices where the hanging lugs are located, relative to the regular polygonal section normally defined by the casing. In this way, the stresses borne by the plates of the exhaust casing adjacent the hanging lugs remain restricted to tensile and compression stresses. In addition, the local deformation of the polygonal cross-section of the casing ensures a better continuity of the theoretical flow stream of exhaust gases through the casing than in the case where the casing cross-section is a regular polygon.

Thus, when the exhaust casing includes a central hub and a plurality of arms interconnecting the hub and the casing substantially at the vertices of the polygon defined by the cross-section of the casing, the arms and the hub may divide the interior of the casing into a plurality of sectors all having substantially the same area as each other.

Moreover, the local deformation of the polygonal cross-section enables all of the arms to be of substantially equal length, which ensures a better mechanical behavior of the assembly during thermal expansion.

Preferably, the casing has an indented portion in line with each of the hanging lugs, the indented portion reducing the cross-sectional area of each of the sectors on opposite sides of the arm which is connected to the casing at the position of the hanging lug by an amount which is substantially equal to the amount by which the area is increased as a result of the vertex at which the geometric axis of the hanging lug is situated being offset radially outwards relative to the first polygon.

A preferred embodiment of the invention will now be described, by way of example, with reference to the attached drawings.

BRIEF DESCRIPTION OF THE DRAWINGS

FIG. 4 is a view showing a part of FIG. 3 and illustrating the compensation of the reduction in the cross-sectional area of the theoretical flow path of the exhaust gases in the vicinity of a hanging lug by the increase in area resulting from the outward deformation of the polygonal cross-section of the exhaust casing at the position of this lug in accordance with the invention.

DESCRIPTION OF THE PREFERRED EMBODIMENT

Figure 1:
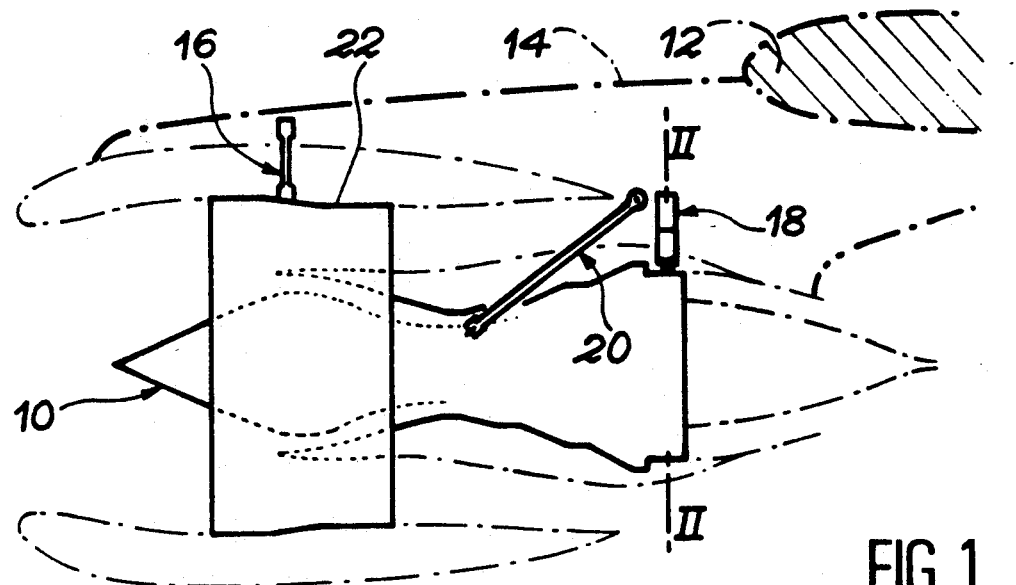
FIG. 1 is a partly sectional side view illustrating in a very diagrammatic manner the suspension of a turbojet engine under an aircraft wing.

Shown in FIG. 1 is the suspension of a turbojet engine 10 under an aircraft wing 12 of which only the forward part is visible, the suspension being achieved by means of a mast 14 which projects forward below the leading edge of the wing 12.

The turbojet engine 10 is suspended from the mast 14 by a forward suspension structure 16 and a rear suspension structure 18 permitting demounting of the turbojet engine whenever necessary. The connection between the turbojet engine 10 and the mast 14 is completed by thrust take-up bars 20 situated on both sides of the engine and through which the thrust exerted by the turbojet engine is transmitted by the mast 14 to the wing 12 of the aircraft.

The forward suspension structure 16 of the turbojet engine 10 normally comprises suspension links (not shown) fastened at their upper ends to the forward part of the mast 14, and at their lower ends to the fan casing 22.

The rear suspension structure 18 comprises, in a known manner, an arc-shaped hanging structure (not shown) secured under the mast 14, and suspension links (not shown), of which there are generally three in number, attached by axles at their upper ends to the arc-shaped hanging structure, and by axles at their lower ends to hanging lugs or bosses 24 formed integrally with the exhaust casing 26 of the turbojet engine 10.

Figure 2:
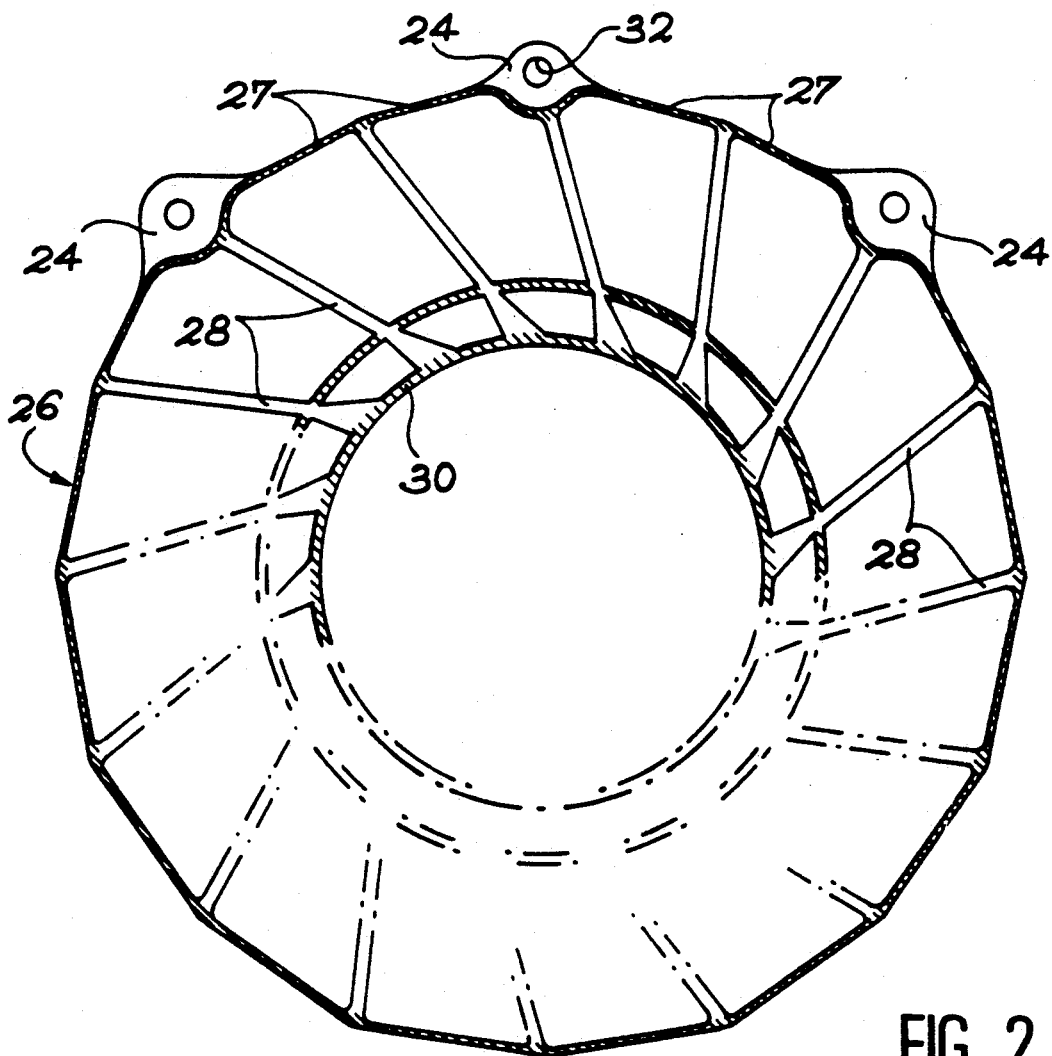
FIG. 2 is a cross-section taken along line II-II in FIG. 1, illustrating on a larger scale the exhaust casing of the engine constructed in accordance with a preferred embodiment of the invention.

As shown in FIG. 2, the exhaust casing 26 of the turbojet engine is a unitary casing which has a cross-sectional shape in the form of a polygon, the polygon having sixteen vertices and sides in the example shown. The sides of the polygon are defined by successive flat plates 27 of the exhaust casing 26. The casing 26 is connected by rectilinear arms 28 to a central hub 30, the arms 28 being evenly distributed around the periphery of the hub 30 and being connected at their outer ends one to each of the vertices of the polygonal cross-section of the casing 26. There are therefore sixteen arms 28 in the embodiment shown in FIG. 2.

In a known manner, the arms 28 are all inclined in the same direction and at the same angle, for example 15°, relative to a radial direction. This characteristic permits differential expansion between the exhaust casing 26 and the hub 30, without involving the risk of buckling in the arms 28.

Each of the three hanging lugs 24 with which the exhaust casing 26 is externally provided has a through hole 32, of circular cross-section, for receiving an axle (not shown) to connect the hanging lug to the lower end of a suspension link (not shown). The three hanging lugs 24 are located on the upper part of the casing 26 so that the geometrical axes of the through holes 32 coincide with three of the vertices of the polygon defined by the cross section of the casing.

One of these vertices is situated in the central vertical plane of the casing 26, while the other two vertices are arranged symmetrically relative to this plane and are each separated from the vertex having the central hanging lug 24 by a single intermediate vertex having no hanging lug. The two vertices carrying the outer hanging lugs are therefore situated at 45° on each side of the central vertical plane when the polygonal cross-section of the casing has sixteen sides.

Figure 3:
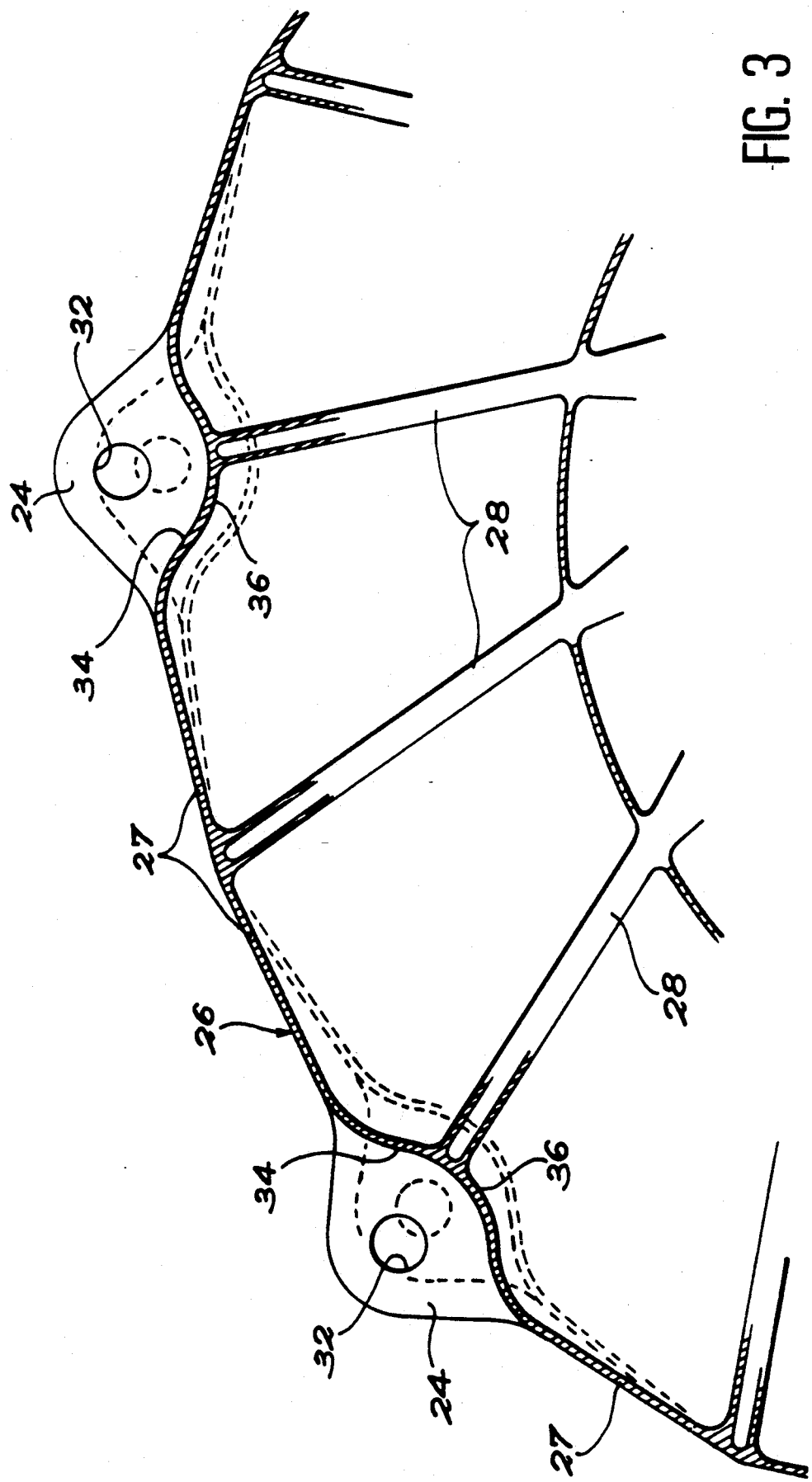
FIG. 3 is a view of part of FIG. 2 on a still larger scale showing the structure of the exhaust casing in the vicinity of the hanging lugs which are carried by the casing, the arrangement in accordance with the invention being represented in full lines whereas the arrangement utilized by the prior art is shown by the broken lines.

In accordance with the invention, the vertices of the polygon defined by the cross-section of the casing 26, other than those which are coincident with the geometrical axes of the through holes 32, coincide with a regular polygon circumscribed by the theoretical flow path of the exhaust gases inside the casing 26 as defined by circle A indicated in FIG. 4. The vertices which are coincident with the geometical axes of the holes 32 in the lugs 24, however, are offset radially outward relative to the above-mentioned first polygon through the other vertices. This characteristic is clearly seen in FIG. 3 in which the full lines represent the shape of the casing 26 in accordance with the invention, and the broken lines indicate the shape which the casing 26 would have in the parts adjacent the lugs 24 if the polygon defined by the cross-section of the casing were regular at these points.

In other words, the polygon defined by the cross-section of the exhaust casing 26 is non-regular, being deformed radially outwards at each of the three vertices at which the lugs 24 are located so that the axis of the hole 32 provided in each lug is displaced outwards by the same distance, in the direction of the respective arm 28, from the position which the same axis would occupy if the polygon were regular at this point.

This deformation of the polygon defined by the cross-section of the exhaust casing 26 is such that the axis of the hole 32 provided in each of the lugs 24 remains situated in line with each of the flat plates 27 of the casing 26 defining the sides of the polygon adjacent the respective vertex, as well as in line with the corresponding arm 28. As a result of this arrangement, the hanging of the exhaust casing 26 from the rear suspension structure 18 (FIG. 1) generates only tensile or compression stresses in the arms 28 and the plates of the casing adjacent the lugs 24, not bending stresses. Consequently, the thickness of the casing plates 27 may be minimized and the mass of the turbojet engine is not penalized by the suspension structure.

In addition, and as illustrated best in FIG. 4, the deformation of the polygon defined by the cross-section of the exhaust casing 26 in the vicinity of each of the hanging lugs 24 enables all of the sectors of the casing 26 defined between the arms 28 to have substantially the same cross-sectional area as each other around the entire circumference of the casing, despite the presence of a scallop-shaped indented portion 34 in the outer surface of the casing 26, which forms a corresponding boss 36 on the inner surface, in line with each of the lugs 24. This is because the reduction B of the area of the theoretical flow path inside each sector of the casing adjacent the arm 28 connected to the casing at a lug 24, resulting from the presence of the boss 36, has a value substantially equal to the increase C of the area of the theoretical flow path in the same sector which results from the offsetting radially outward of the vertex of the polygon at the position of the lug 24. As a result of this particular arrangement, the continuity of the theoretical flow path of the exhaust gases of the turbojet engine is practically undisturbed by the presence of the lugs 24.

Furthermore, the outward deformation of the polygon defined by the cross-section of the exhaust casing 26 at the positions of the hanging lugs 24 has the effect of enabling the corresponding arms 28 to have a length very close to that of the other arms 28. The mechanical behavior of the assembly when thermal expansion occurs is thus improved.

In practice, the depth of the indented portions 34 and, consequently, the inward extent of the corresponding bosses 36 are larger as the diameter of the through holes 34 is larger. Consequently, the outward offset of the axis of the each hole 32 relative to the corresponding vertex of the regular polygon through all of the vertices not provided with a lug 24 is greater as the diameter of the holes is greater.

It will of course be appreciated that the invention is not limited to the particular embodiment which has been described above by way of example, and a variety of alternatives may be envisaged. For example, it will be appreciated that the number of hanging lugs provided on the exhaust casing may be greater than three if it is desired to provide one or more additional hanging points in order to increase safety.

I claim:

1. An exhaust casing for a turbojet engine, wherein: said casing has a cross-sectional shape substantially in the form of a polygon having a plurality of vertices;

said casing comprising:

at least three hanging lugs carried externally by said casing for forming part of a rear suspension structure for the engine, each of said at least three hanging lugs having a geometrical axis positioned at a respective vertex of said polygon, wherein a first polygon can be drawn through all of the vertices except said respective vertices having said at least three hanging lugs positioned thereat, and a second non-regular polygon can be drawn through all of the vertices, said respective vertices at which said hanging lugs are located being outwardly radially offset with respect to said first polygon; wherein:

one of said respective vertices having one of said at least three hanging lugs positioned thereat is located in a central vertical plane of the casing and the other respective vertices having the other two of said at least three hanging lugs positioned thereat are symmetrically located on each side of said vertical plane and are each separated from the respective vertex located in the vertical plane by a single intermediate vertex having no hanging lugs positioned thereat.

2. The exhaust casing according to claim 4, including a central hub and a plurality of arms interconnecting said central hub and said casing substantially at said vertices of said first polygon defined by the cross-section of said casing, said arms and said hub dividing the interior of said casing into a plurality of sectors all having substantially the same cross-sectional area as each other.

3. The exhaust casing according to claim 2, wherein said casing has an indented portion in line with each of said hanging lugs, said indented portion reducing the cross-sectional area of each of said sectors on opposite sides of said arm which is connected to said casing at the position of said hanging lug by an amount which is substantially equal to the amount by which said area is increased as a result of the vertex at which the geometric axis of said hanging lug is situated being offset radially outwards relative to said first polygon.

* * * * *

UNITED STATES PATENT AND TRADEMARK OFFICE
CERTIFICATE OF CORRECTION

PATENT NO. : 5,259,183
DATED : November 9, 1993
INVENTOR(S) : PIERRE DEBENEIX

It is certified that error appears in the above-indentified patent and that said Letters Patent is hereby corrected as shown below:

In column 2, line 35, change "said" to --the--.
In column 2, line 37, change "said" to --the--.
In column 6, line 27, change "4" to --1--.

Signed and Sealed this

Thirteenth Day of December, 1994

Attest:

BRUCE LEHMAN

Attesting Officer     Commissioner of Patents and Trademarks